(12) United States Patent
Tofin et al.

(10) Patent No.: US 6,591,974 B2
(45) Date of Patent: Jul. 15, 2003

(54) AUGER FLOW CONTROL SPOUT WITH OVERFLOW

(75) Inventors: Darcy Tofin, 602B - 51st Street East, Saskatoon (CA), S7K 7K3; Leslie G. Hill, Humboldt (CA)

(73) Assignee: Darcy Tofin, Saskatoon (CA)

( * ) Notice: Subject to any disclaimer, the term of this patent is extended or adjusted under 35 U.S.C. 154(b) by 0 days.

(21) Appl. No.: 09/825,289

(22) Filed: Apr. 4, 2001

(65) Prior Publication Data

US 2001/0040084 A1 Nov. 15, 2001

(51) Int. Cl.[7] .................................................. B65G 33/00

(52) U.S. Cl. ........................ 198/671; 198/560; 198/657; 406/164

(58) Field of Search ..................... 198/560, 657, 198/658, 671, 550.2, 550.3, 359, 360, 537; 406/164, 165, 166; 193/4, 23; 414/299, 397

(56) References Cited

U.S. PATENT DOCUMENTS

| | | | | | |
|---|---|---|---|---|---|
| 648,741 | A | * | 5/1900 | Hartley | 406/100 |
| 931,222 | A | * | 8/1909 | Rosenthal | 406/164 |
| 1,087,667 | A | * | 2/1914 | Kise | 406/165 |
| 1,100,959 | A | * | 6/1914 | Dick | 406/98 |
| 1,847,433 | A | * | 3/1932 | Krause | 198/536 |
| 3,568,819 | A | * | 3/1971 | Mann | 198/536 |
| 4,407,380 | A | * | 10/1983 | Elder | 177/145 |
| 4,738,774 | A | * | 4/1988 | Patrick | 209/236 |
| 5,035,543 | A | * | 7/1991 | Medemblik et al. | 406/39 |
| 5,167,581 | A | * | 12/1992 | Haag | |
| 6,296,435 | B1 | * | 10/2001 | Wood et al. | 414/523 |

* cited by examiner

Primary Examiner—Christopher P. Ellis
Assistant Examiner—Richard Ridley
(74) Attorney, Agent, or Firm—Aikins, MacAuley & Thorvaldsod; Murray E. Thrift

(57) ABSTRACT

A spout is used for confining the grain flow from an auger. The auger may be a combine, grain cart unloading auger or a grain auger. The spout includes a chute that mounts on the auger tube. An overflow opening in the chute allows grain or other matter to flow out of the spout if the outlet of the chute is plugged. This prevents filling and overloading of the auger and consequent auger damage.

17 Claims, 3 Drawing Sheets

AUGER FLOW CONTROL SPOUT WITH OVERFLOW

FIELD OF THE INVENTION

The present invention relates to auger discharge control and more particularly to a flow control spout for an auger, especially the unloading auger of a combine harvester.

BACKGROUND

Grain or seed is delivered from a combine harvester to the box of a grain truck by a delivery auger on the combine. The auger has a discharge at the end of the auger tube through which the grain is delivered. Because the grain is delivered at a high flow rate, there is a considerable spreading of the grain or seed as it leaves the auger discharge. This in turn leads to "splash", spillage and wind loss. This may be controlled by a spout according to international patent application PCT/CA 98/00760. In use the spout is attached to the end of the auger to provide containment of the grain flow. It includes a chute having a receiving opening larger than the auger tube discharge opening and an outlet opening smaller than the receiver opening. A convergent peripheral wall extends from the inlet opening towards the outlet opening. When mounted on the auger tube, the receiving opening confronts the auger tube discharge opening and the peripheral wall slopes outwardly and downwardly from the end of the auger tube and under the discharge opening.

The sloping peripheral wall intercepts flow from the auger discharge, and redirects the flow to a direction with an outward component. This concentrates the flow from the auger without causing it to back up. In most cases, frusto-conical extensions are mounted on the chute as described in the application referenced above.

If, through inadvertence of an operator or any other cause, grain or seed is allowed to rise to the level of the spout discharge, the spout discharge may become closed, allowing the grain or seed to build up in the spout and then the auger. This will overload the auger and cause damage to the auger and its drive.

Another potential problem may arise if the spout comes into contact with an external object. For example, if the spout is positioned too low with respect to a truck being loaded and the truck hits the spout, damage may be caused to the spout, the auger or the truck.

The present invention is concerned with improvements in the spout that address these concerns.

SUMMARY

According to one aspect of the present invention there is provided a spout for an auger having an auger tube with an outer end and an auger tube discharge opening adjacent the outer end, the spout comprising:
 a chute having:
  a receiving opening;
  an outlet opening; and
  a convergent peripheral wall extending from the inlet opening towards the outlet opening;
  an overflow opening in the peripheral wall; and
 a chute mount for mounting the chute on the auger tube with the receiving opening confronting the auger tube.

If the level of the material being conveyed rises to an undesirable level inside the chute for any reason, the excess will flow out of the overflow, preventing or delaying filling of the auger and giving the operator the opportunity to situation, either by removing a blockage or shutting down the auger.

The overflow is positioned out of the normal flow path of the material being conveyed, so that material is not lost through the overflow. It may be an outer overflow in an outwardly sloping outer side of the peripheral wall or an inner overflow in the inner side of a discharge collar forming the lowermost part of the peripheral wall, around the outlet opening. In preferred embodiments, both overflows are used.

The discharge collar is preferably frusto-conical. In use, the inner side of the chute intercepts the flow out of the auger discharge and directs it outwardly where it impinges upon and swirls about the inside of the collar to discharge downwardly from the spout.

To avoid the loss of material through the inner overflow, the peripheral wall may include a lip extending forwardly at the top of the discharge collar, over the inner overflow.

The inner overflow opening provides overflow capacity additional to that of the outer overflow and also an early visual warning to an operator of an overflow condition. This early warning can be augmented by placing a sensor in the inner overflow, for example a microswitch actuator at the bottom edge, to detect the onset of an overflow over the bottom edge.

The ingress of material into the chute through the outer overflow opening, high wind conditions and overshoot of material from the auger through the outer overflow can be concerns. These can be dealt with by providing a shield across the opening. This may be spaced sufficiently from the peripheral wall of the chute that there is no undue restriction of flow. Alternatively, the shield may be sufficiently light weight and freely movable that free flow is not impeded.

According to another aspect of the present invention there is provided a spout for an auger having an auger tube with an auger tube discharge opening on a bottom side of the auger tube, the spout comprising:
 a chute having:
  a receiving opening;
  an outlet opening; and
  a convergent peripheral wall extending from the inlet opening towards the outlet opening;
 a chute mount for mounting the chute on the auger tube for rotation about the auger tube from a normal position in which the receiving opening confronts the auger tube discharge opening and the peripheral wall depends from the auger tube, and a released position in which the peripheral wall extends laterally from the auger tube; and
 a chute centring device for biasing the spout to the normal position.

With this arrangement, engagement of the spout with an external object, for example a truck box, will rotate the spout to a sideways orientation to clear the obstruction with minimal, and preferably no, damage. The chute will automatically return to the normal position once it is released from the external engagement.

In preferred embodiments, the chute mount includes a substantially cylindrical hood for engagement over the outer end of the auger tube. The chute centring device preferably acts as a retainer holding the hood in place on the tube. The centring device may include a band clamped onto the auger tube and an end flange on the chute to engage the band and limit the travel of the chute along the auger tube. One or more resilient elements, for example springs or elastomeric straps, connect the band and the end flange to bias the chute to the normal position.

BRIEF DESCRIPTION OF THE DRAWINGS

In the accompanying drawings, which illustrate exemplary embodiments of the present invention.

DETAILED DESCRIPTION

Figure 2:
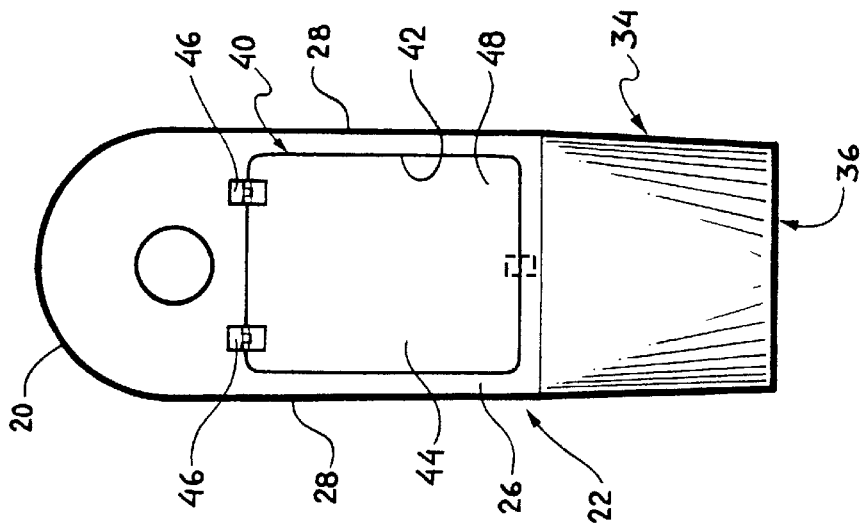
FIG. 2 is an outer end view of the spout.

Referring to the accompanying drawings and especially to FIGS. 1 through 5, there is illustrated a spout 10 for use on a combine unloading auger 12. The auger has an auger tube 14 with an outer end 16 and a discharge opening 18 on the bottom side of the tube, adjacent the outer end.

The spout 10 includes a hood 20 that extends over the end of the auger tube and along the auger tube, beyond the discharge opening 18. A chute 22 depends from the hood, below the discharge opening. A peripheral wall 24 of the chute includes an outer end portion 26, two side portions 28 and an inner end portion 30. The peripheral wall slopes outwardly from the end of the auger tube, with the outer end portion 26 extending beyond the end of the auger tube and the inner end portion 30 extending under the discharge opening of the auger tube.

Figure 1:
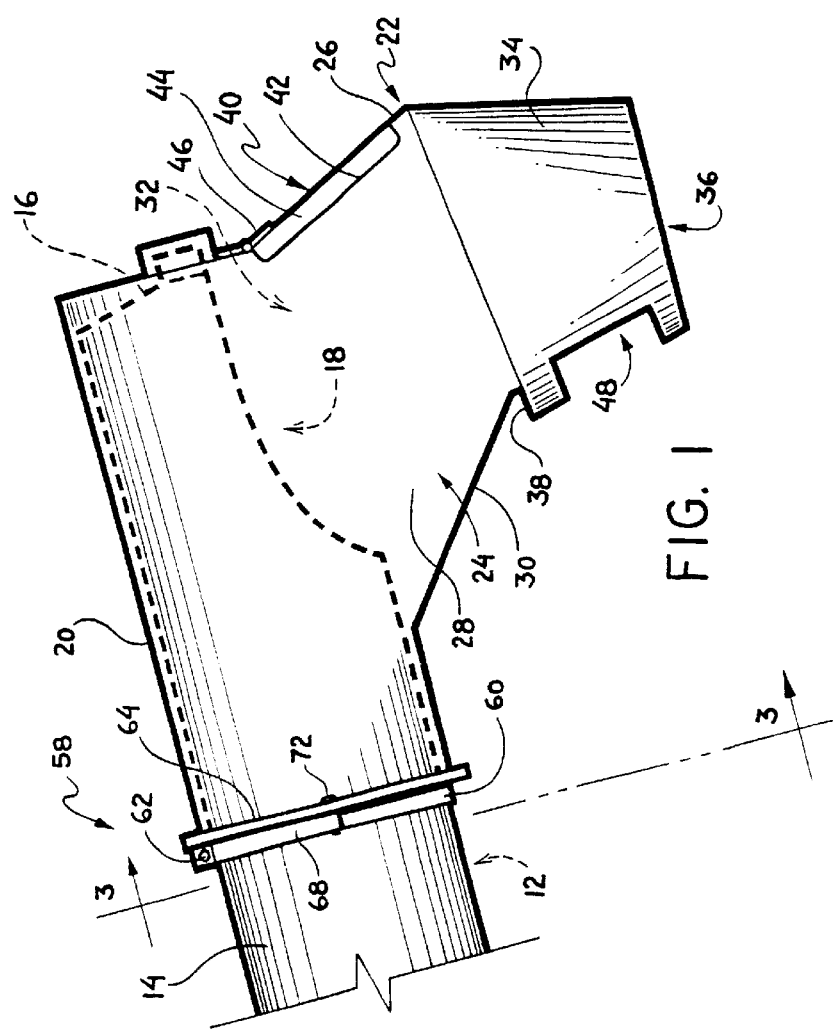
FIG. 1 is a side elevation, partially broken away, of a spout according to the present invention mounted on the end of an auger.
Figure 3:
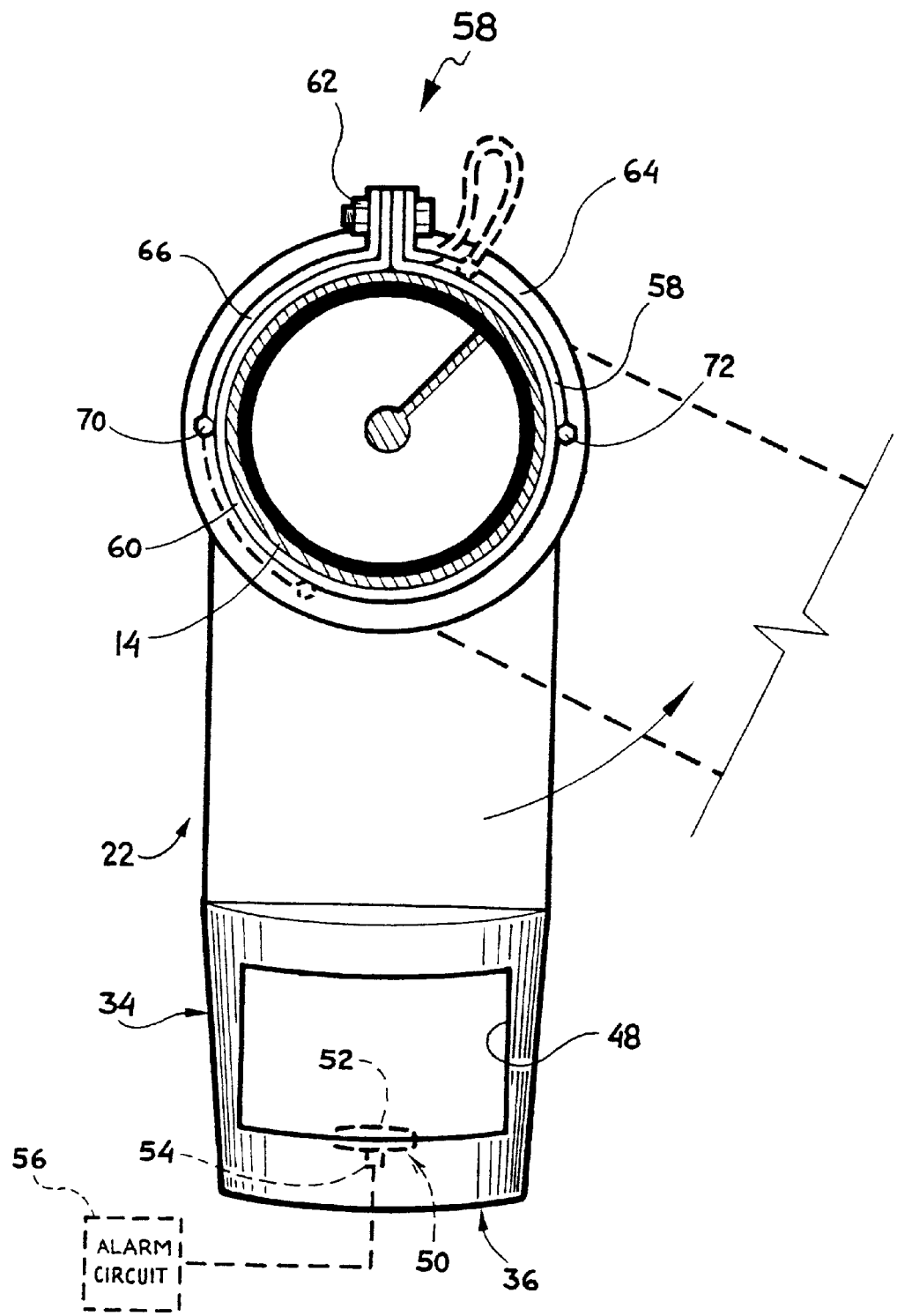
FIG. 3 is view along line 3—3 of FIG. 1.

At the top, the chute has a receiving opening 32 circumscribed by the peripheral wall 24. In the normal position illustrated in solid line in FIG. 3 the receiving opening confronts the discharge opening 18 of the auger tube. At its bottom end the peripheral wall forms a frusto-conical discharge collar 34 leading to a chute outlet opening 36 that is off-set outwardly with respect to the receiving opening. Both the inner end portion 30 and outer end portion 26 of the peripheral wall 24 slope outwardly with respect to the auger tube, with the inner end portion 30 converging towards the outer end portion 26 so that the chute tapers from the receiving opening 32 to the discharge collar 34. The collar is inclined with respect to the flow leaving the upper section of the chute, so that the grain flow will be re-directed down into a grain box. As illustrated in FIG. 1, the upper part of the inner end portion 30 of the chute peripheral wall extends outwardly over the upper end of the discharge collar, forming a lip 38 overhanging the inner side of the discharge collar.

An outer overflow 40 is provided in the outer end portion 26 of the chute peripheral wall. This includes overflow opening 42 that is generally rectangular with rounded corners. In the illustrated embodiment, an optional deflector panel 44 extends across the overflow opening to cover the opening. At the top, the panel is connected to the body of the chute by hinges 46 on which the panel may pivot to an open position. The force needed to keep the panel closed for normal operation of the spout is small, just sufficient to counter the impact of a small quantity of grain scattered from the main flow leaving the auger. When a body of grain or seed builds up in the chute for any reason, the panel moves aside to allow the excess material to flow out without damaging the spout, the auger or the auger drive.

A second, inner overflow opening 48 of rectangular shape is formed in the inner side of the discharge collar 34 below the lip 38. This inner opening, being lower and on the inner side will begin to discharge grain earlier than the outer opening at a position that is more visible to an operator than the outer opening.

In use, grain or other material being discharged from the auger discharge 18 will fall onto the sloping inner side of the chute 22. It is then redirected towards the outer side of the collar 34. The collar then redirects the flow once more to provide a condensed flow down out of the collar. The flow in the spout passes under the overflow opening 40 and over the overflow opening 48.

An optional sensor 50 may be mounted on the spout to detect the onset of an overflow. The illustrated sensor is a small paddle 52 extending into the bottom side of the overflow 48 and a microswitch 54 operated by outward deflection of the paddle. The sensor is connected to a circuit 56 to generate an alarm condition, operating an audible or visual alarm or to shut down the auger.

The spout is mounted on the auger tube using a chute mount 58 at the inner end of the spout. The mount includes an annular band 60 spaced from the inner end of the hood 20. The band is a flexible, resilient strap wrapped around the auger tube and clamped in place using a bolt 62. The band 60 engages a flange 64 on the inner end of the hood 20 to limit the travel of the chute along the auger tube. Two additional resilient straps 66 and 68 are connected to the band 60 by the bolt 62 and extend in opposite directions around the auger tube to pins 70 and 72 respectively which anchor the straps to the flange 64.

By maintaining tension on the straps 66 and 68, the spout is restrained against axial movement off the end of the auger tube. If the chute comes into contact with an external object, for example a truck box, the spout may rotate as shown in broken line in FIG. 3. In most cases this will release the engagement with little or no damage. Rotation of the spout tensions one of the straps 66 and 68, and relaxes the other, thus biasing the chute back to the normal position.

Figure 4:
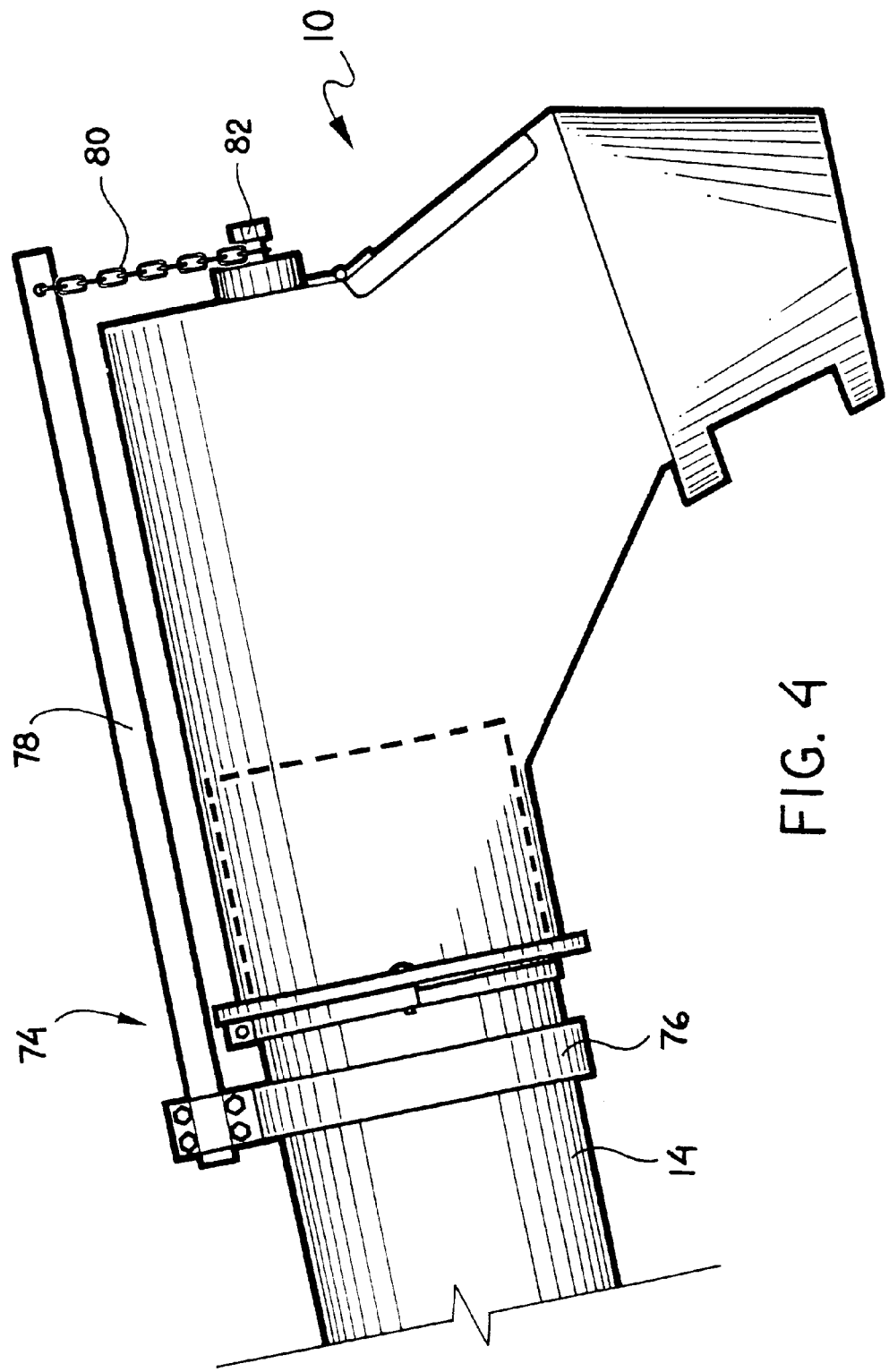
FIG. 4 is a side elevation showing a spout support bracket.

When the spout is installed on an auger tube that has an axial discharge from the end of the auger tube the spout is only supported on the auger tube by a short portion of its length. As shown in FIG. 4, a bracket 74 is then mounted on the auger tube to support the outer end of the spout. The bracket includes a clamp 76 clamped on to the auger tube and a support bar 78 mounted on the clamp and extending along the auger past the end of the spout. A chain 80 is connected to the support bar and to a pin 82 at the end of the spout to suspend the outer end of the spout. While allowing it to rotate.

While one particular embodiment of the present invention has been described in the foregoing, it is to be understood that other embodiments are possible within the scope of the invention and are intended to be included herein. In one such embodiment, the panel 44 is not included, the overflow 42 being left open. In another embodiment, a wind shield is spaced from and extends across the outer over flow opening 42. Without restricting the overflow from the opening, this inhibits the ingress of foreign matter and wind into the spout. In view of these and other modifications that may be made, the invention is be considered limited solely by the scope of the appended claims.

What is claimed is:

1. A spout for an auger having an auger tube with an outer end and an auger tube discharge opening adjacent the outer end, the spout comprising:
    a chute having:
        a receiving opening;
        an outlet opening; and
        a convergent peripheral wall extending from the inlet opening towards the outlet opening;
        an overflow opening in the peripheral wall, and
    a chute mount for mounting the chute oh the auger tube with the receiving opening confronting the auger tube.

2. A spout according to claim 1 wherein the outlet opening is offset outwardly with respect to the receiving opening such that an outer side of the peripheral wall slopes outwardly, and the overflow opening is an outer overflow opening in the outer side of the peripheral wall.

3. A spout according to claim 1 wherein the discharge collar is substantially frusto-conical.

4. A spout according to claim 1 including an inner overflow opening in the discharge collar at an inner side thereof.

5. A spout according to claim 3 including an inner overflow opening in the discharge collar at an inner side thereof.

6. A spout according to claim 4 wherein an inner side of the peripheral wall includes a lip extending outwardly over the upper end of the discharge collar.

7. A spout according to claim 5 wherein an inner side of the peripheral wall includes a lip extending outwardly over the upper end of the discharge collar.

8. A spout according to claim 4 including a sensor in the inner overflow opening for detecting the onset of an overflow through the inner overflow.

9. A spout according to claim 1 wherein the chute mount comprises means for mounting the spout on the auger tube for free rotation about the auger tube.

10. A spout according to claim 9 including resilient means biasing the spout to a normal position about the auger.

11. A spout according to claim 1, the chute mount comprising means for mounting the chute on the auger tube for rotation about the auger tube from a normal position in which the receiving opening confronts the auger tube discharge opening and the peripheral wall depends from the auger tube, and a released position in which the peripheral wall extends laterally from the auger tube; and the spout further comprising a chute centering device for biasing the spout to the normal position.

12. A spout according to claim 11 wherein the chute mount includes a substantially cylindrical hood for engagement over an outer end of the auger tube.

13. A spout according to claim 12 wherein the centring device includes a band clamped onto the auger tube and an end flange on the hood to engage the band and limit the travel of the chute along the auger tube.

14. A spout according to claim 13 including one or more resilient elements connecting the band and the end flange to bias the chute to the normal position.

15. A spout according to claim 2 including a shield extending across the outer overflow opening to prevent the ingress of material into the chute.

16. A spout according to claim 5 including a shield extending across the outer overflow opening to prevent the ingress of material into the chute.

17. A spout according to claim 1 wherein the peripheral wall includes an supper portion adjacent the receiving opening and a lower portion comprising a discharge comer adjacent the outlet opening.

* * * * *

UNITED STATES PATENT AND TRADEMARK OFFICE
CERTIFICATE OF CORRECTION

PATENT NO. : 6,591,974 B2
DATED : July 15, 2003
INVENTOR(S) : Darcy Tofin

It is certified that error appears in the above-identified patent and that said Letters Patent is hereby corrected as shown below:

<u>Title page</u>,
Item [74], *Attorney, Agent, or Firm*, change "Aikis, MacAulay & Thorvaldsod" to read -- Aikins, MacAulay & Thorvaldson --.

<u>Column 5</u>,
Line 4, claim 3 should read:
3. A spout according to Claim 17 wherein the discharge collar is substantially frusto-conical.
Line 6, claim 5 should read:
5. A spout according to Claim 3 including an inner overflow opening in the discharge collar at an inner side thereof.

<u>Column 6</u>,
Line 23, claim 17 should read:
17. A spout according to Claim 1 wherein the peripheral wall includes an upper portion adjacent the receiving opening and a lower portion comprising a discharge collar adjacent the outlet opening.

Signed and Sealed this

Twenty-eighth Day of September, 2004

JON W. DUDAS
*Director of the United States Patent and Trademark Office*